Patented Apr. 5, 1927.

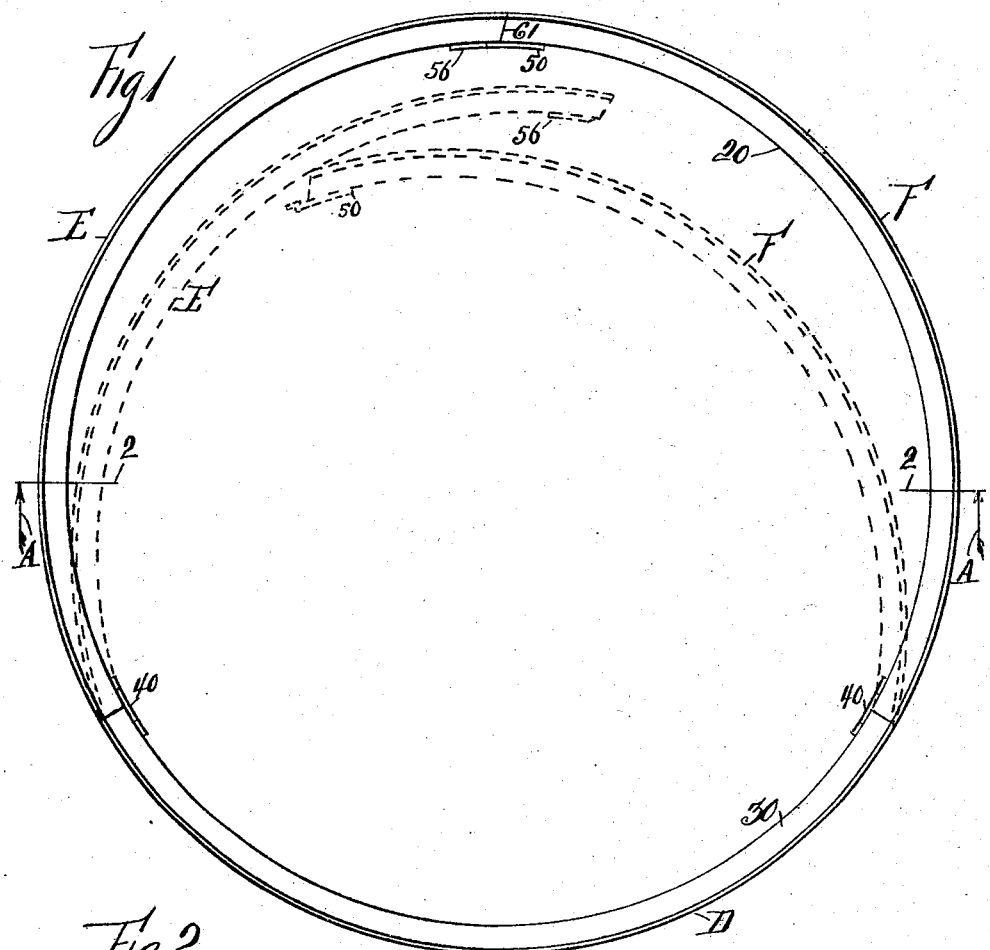
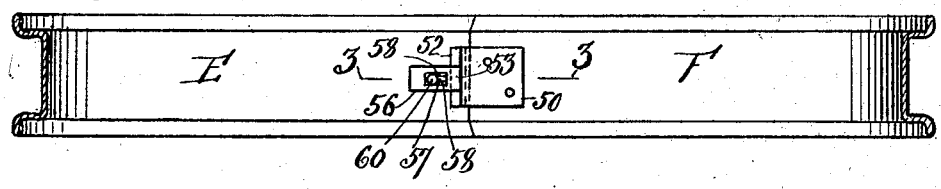
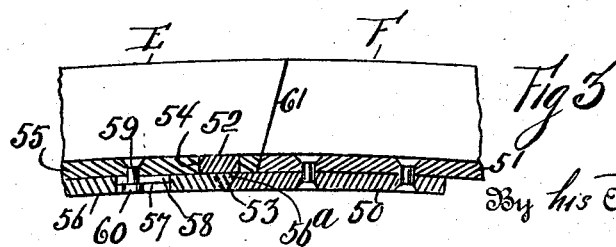

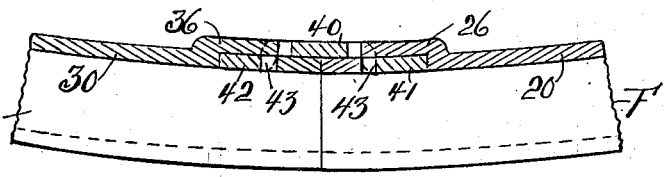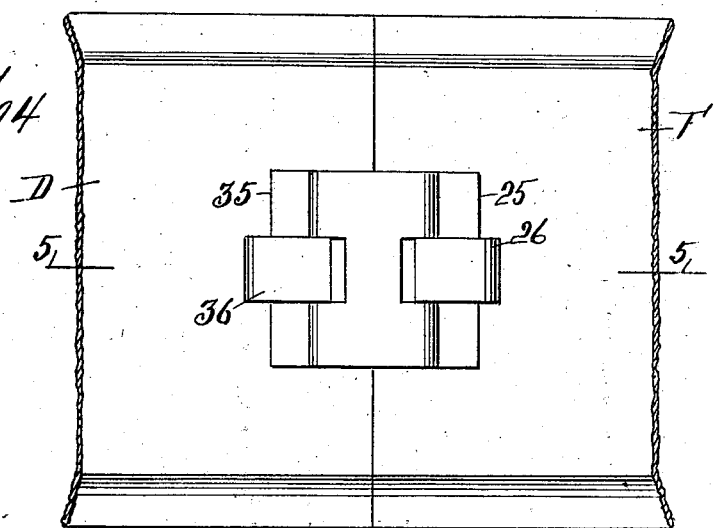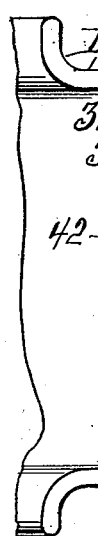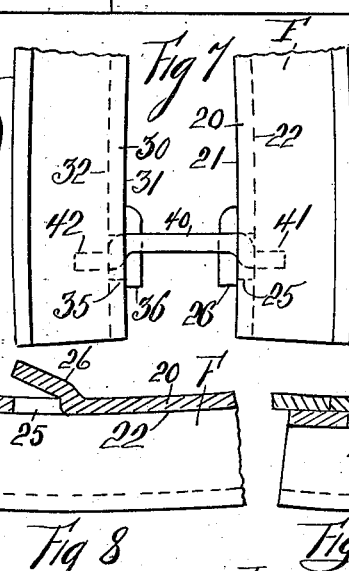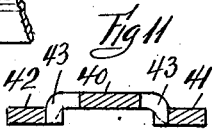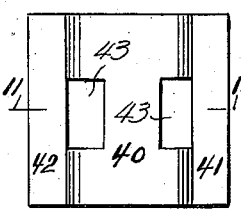

1,623,372

UNITED STATES PATENT OFFICE.

LEO B. WISHNEVSKY, OF BROOKLYN, NEW YORK, ASSIGNOR TO FRED M. HEYMAN, OF NEW YORK, N. Y.

DEMOUNTABLE RIM.

Application filed March 24, 1923. Serial No. 627,362.

This invention relates to demountable rims. The object of the invention is the production of a rim for the wheel of a vehicle, which can be easily demounted from the felly of the wheel.

A second object of the invention is the production of a rim which can be collapsed to easily mount a tire thereon, or remove it therefrom. A third object is the production of a rim composed of sections hinged to each other and also with a pair of sections detachably locked to each other.

The accompanying drawings show exemplifications of the invention in which Fig. 1 represents a side elevation of the demountable rim in operative position and a pair of sections thereof in dotted lines when in a collapsed position; Fig. 2 shows a section of Fig. 1 on the line 2—2 viewed in the direction of the arrows A; Fig. 3 indicates an enlarged section of Fig. 2 on the line 3, 3; Fig. 4 shows an enlarged plan view of fragmentary portions of a pair of sections of the rim; Fig. 5 indicates a section of Fig. 4 on the line 5, 5; Fig. 6 shows a bottom view of Fig. 5 with the fragmentary portions of the sections of the rim located at right angles to their positions represented in Fig. 5, indicating the collapsible feature of the rim; Fig. 7 is a top plan view of Fig. 6; Fig. 8 represents one of the portions of Fig. 5 before being assembled; Fig. 9 shows a view similar to Fig. 8 with a modification; Fig. 10 shows a top plan view of a locking plate and Fig. 11 indicates a section of Fig. 10 on the line 11—11.

The rim in this instance is indicated with three arcuately shaped sections designated in their entireties by the letters D, E and F. The sections D, F and D, E are hinged in a similar manner to enable them to collapse. The abutting ends of the section D and the sections E and F are on radial planes of the rim. The connections between the sections D and F will now be described in detail, which will suffice also for the similar connection between the sections D and E. The section F comprises the approximately channel shaped body portion 20 with the inner face 21 adapted to bear on the felly of the wheel on which it is mounted and the outer face 22 which is adapted to support the tire of the rim. An opening 25 is formed in the body portion 20 adjacent to one end thereof. A narrow projection 26 is formed with the body portion 20 which extends over and completely across the opening 25 and forms a locking means therewith. The section D comprises the approximately channel shaped body portion 30 similar to 20 with the inner face 31 and outer face 32. An opening 35 similar to 25 is formed in the body portion 30, and forms a narrow projection 36 similar to 26 which extends over and completely across the opening 35 and forms a locking means therewith.

An approximately channel shaped locking plate for the sections D and F comprises the raised central portion 40 with the locking jaws 41 and 42 extending from the ends thereof. Openings 43 are formed between the central portion 40 and the jaws 41 and 42. The openings 43 are wide enough to engage the projections 26 and 36.

The locking plate is located upon the inner faces 21 and 31 of the sections of the rim and the jaws 41 and 42 are respectively inserted in the openings 25 and 35, before the projections 26 and 36 are bent in position as shown in Fig. 8. The said projections 26 and 36 are then brought down upon the jaws 41 and 42 and their ends enter the openings 43. By this means the sections D and F and the said channel shaped locking plate are permanently hinged together.

The sections E and F are connected by a latch locking device, which comprises the stationary plate 50 fastened to the body portion 20 of the section F, and which has formed therewith the depending lug 52 having the inclined indent 53 at one end thereof. The lug 52 normally enters and locks with an opening 54 in the body portion 55 of the section E. Upon the body portion 55 of the section E is slidably supported a latch 56 with the tapered end 56ª. An elongated opening 57 is formed in the latch 56. Guide strips 58 are formed with the opening 57. A guide pin 59 with the head 60 extends from the body portion 55 of the section E and extends through the opening 57 with the head 60 bearing on the guide strips 58. When the latch 56 is in its closed position its tapered end 56ª locks with the indent 53. The abutting edges of the sections E and F are shown at 61.

In Fig. 9 the construction of the section F is modified by omitting the projection 26 and substituting therefor the plate 65 which is fastened to the body portion 20 after the hinge plate with its lugs 41 and 42 is placed in position.

To disengage the tire, not shown, from the rim, the said rim is first disengaged from the felly of the wheel in the usual manner. The sections E and F are unlocked from each other by moving the latch 56 out of engagement from the detent 53 of the plate 50. Both of the sections E, F can then be easily swung on their hinge plates to the positions shown in dotted lines in Fig. 1 which will enable the tire, not shown, to be easily removed.

Various modifications may be made in the construction of the rim and its appurtenances and the present exemplification of the invention is to be taken as illustrative and not limitative thereof.

Having described my invention what I desire to secure by Letters Patent and claim is:

In a demountable rim the combination of sections having openings adjacent to their abutting ends and a locking plate spanning said ends of the sections with its end portions in the said openings of the sections, said locking plate having openings, and said sections of the rim having projections extending over their openings to form locking means therewith, said projections engaging the openings in said locking plate to permanently hinge the plate and sections together.

Signed at the borough of Manhattan, city of New York, in the county of New York and State of New York this 8th day of March, A. D. 1923.

LEO B. WISHNEVSKY.